Nov. 17, 1925. Re. 16,211

A. A. JOHNSON

ATTACHMENT FOR CONE WINDING MACHINES

Original Filed July 26, 1921

*Inventor*

ADOLPH A. JOHNSON,

By his Attorneys,

Baldwin Wright

Reissued Nov. 17, 1925. Re. 16,211

UNITED STATES PATENT OFFICE.

ADOLPH A. JOHNSON, OF HANES, NORTH CAROLINA, ASSIGNOR, BY MESNE ASSIGNMENTS, TO DANVILLE CONDITIONING MACHINE COMPANY, INC., OF DANVILLE, VIRGINIA, A CORPORATION OF VIRGINIA.

ATTACHMENT FOR CONE-WINDING MACHINES.

Original No. 1,424,100, dated July 25, 1922, Serial No. 487,795, filed July 26, 1921. Application for reissue filed September 27, 1922. Serial No. 590,989.

*To all whom it may concern:*

Be it known that I, ADOLPH A. JOHNSON, a citizen of the United States of America, residing at Hanes, in the county of Forsyth and State of North Carolina, have invented certain new and useful Improvements in Attachments for Cone-Winding Machines, of which the following is a specification.

My invention relates to cone winding machines.

The object of my invention is to provide means for properly moistening the yarn as it is being unwound from the spindles and wound upon the cones.

Other and further objects and advantages of the invention will be in part apparent and in part described as the specification is proceeded with.

In the accompanying drawings forming part of this specification.

Figure 1:
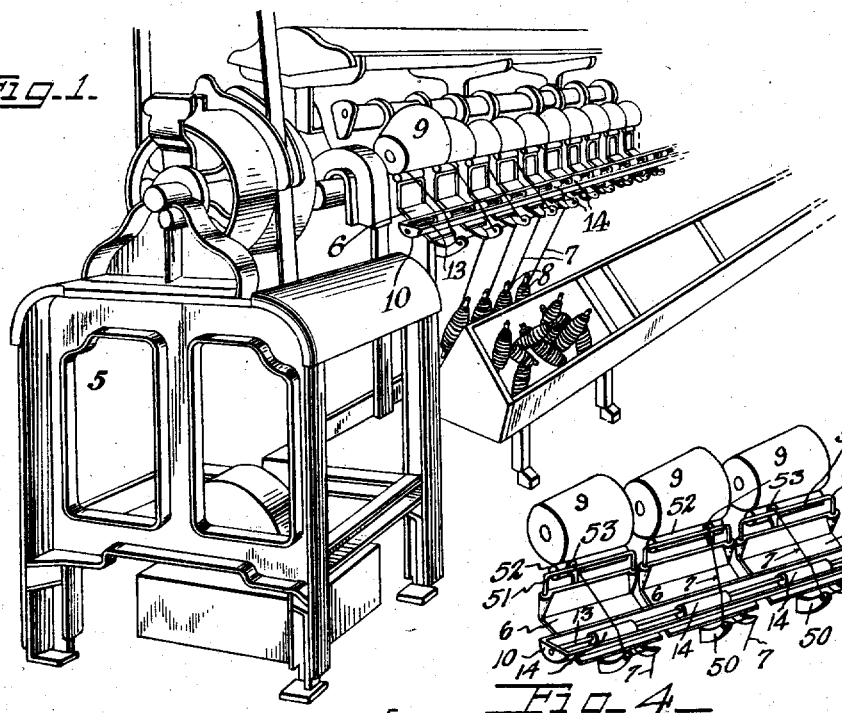
Figure 1 is a perspective view of a cone winding machine showing my invention attached.

Referring more particularly to the drawings, 5 denotes generally the frame of what is known in the art as a "cone winding machine." Suitably mounted on the frame 5 are a number of aprons 6. The yarn 7 is unwound from the spindles or bobbins 8 and thence wound upon the cones 9 in any suitable manner.

As the parts just briefly referred to are old and well known in the art, neither a detailed disclosure in the drawings nor a detailed description thereof in the specification is deemed necessary.

According to my invention a trough 10 is supported from a beam 11 by means of brackets 12 which project outwardly and upwardly between the aprons 6, the trough being suitably secured to the ends of these brackets in position to overlie the aprons. Mounted to rotate in this trough is a shaft 13 provided with spaced enlargements, collars, sleeves or rollers 14 fixed thereto throughout its length, there being a collar or roller for each spindle 8 and in the path of travel of the thread 7 from the spindles or bobbins 8 to the cones 9. These collars or rollers are partially submerged in the water 15 in trough 10. The shaft 13 is rotated at a very slow predetermined rate of speed by any suitable means (not shown). The yarn 7 travels at a very high rate of speed as it is unwound from the spindles or bobbins 8 and consequently very little moisture is taken up by the yarn as it contacts with the rollers or collars. By regulating the speed of rotation of the shaft 13 to the proper ratio of speed of travel between said shaft and the yarn the amount of moisture which the yarn will take up can be regulated to a nicety. In practice it has been found that cotton yarn gives best results when containing about 7% moisture.

By providing the shaft 13 with the collars or rollers 14 a substantial surface thereof is at all times out of contact with the water in the trough 10 and consequently comparatively little moisture is carried by the exposed portion of these collars or rollers. It thus follows that the yarn cannot become saturated with water as in the so called "wet twister" method.

Figure 5:
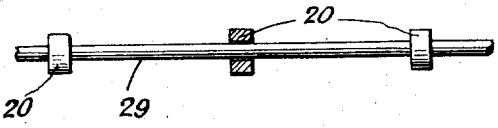
Figure 5 shows a modified form of my invention.

In Figure 5 a modification of my invention is illustrated wherein a stationary shaft 29 is substituted for the rotary shaft 13. Loosely mounted for rotation on the shaft 29 are a plurality of rollers 20 which take the place of and function in like manner to the sleeves, collars or enlargements 14. The frictional engagement of the yarn with the rollers causes the latter to slowly rotate in the water, it being understood that a trough 10 is employed and also that the rollers 20 are partially submerged in the water 15 in the trough.

It will be understood that the cones 9, which revolve about horizontal axes, are rotated by suitable mechanism and that the yarn is passed through suitable guides from the bobbins to the cones. The yarn is laid upon the cones in the usual way by guides which are moved back and forth as usual horizontally from end to end of the cones while the yarn is being wound thereon.

Figure 4:
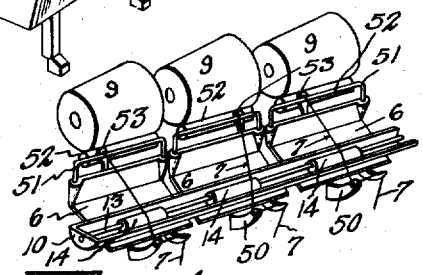
Figure 4 is a perspective view illustrating the relation of the moisture applying devices, the cones, and the devices for giving a sidewise movement to the yarn while being wound on the cones.

Figure 4 illustrates the relation of the moisture applying devices, the cones, and the devices for giving a sidewise movement to the yarn while being wound on the cones. Each yarn passes through a guide 50 across a roller or collar 14 and across a support 51 to and through a guide 53, which latter guide is reciprocated by suitable mechanism such as that employed in the well known Foster winder. The rollers for rotating the cones are indicated at 52.

Figure 2:
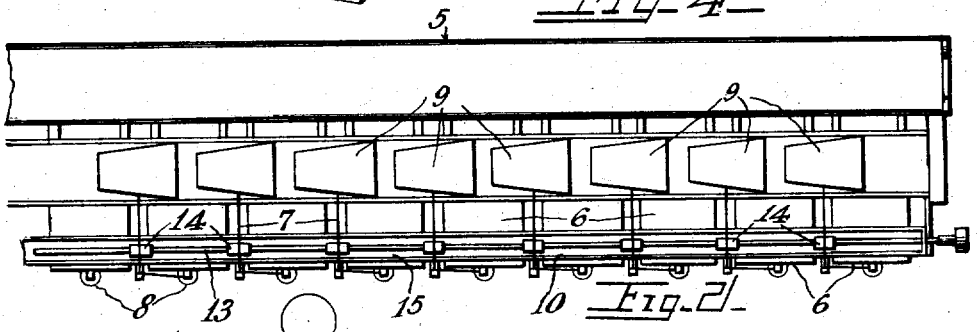
Figure 2 is a fragmentary plan view of Figure 1.
Figure 3:
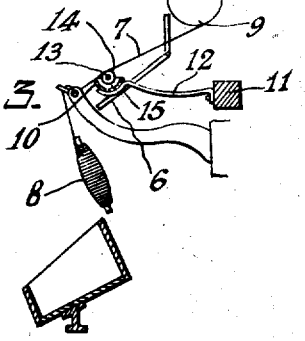
Figure 3 is a transverse sectional view through Figure 1.

It will be observed by reference to Figure 2 that the rollers or collars 14 are arranged in the same vertical planes as the middle portions of the cones and that they are of such length that as the yarn passes over them it will remain in contact therewith at all times during the sidewise movement of the yarn while being wound.

By employing a shaft of small diameter and placing the collars or rollers thereon, less liquid is raised from the trough than if a shaft or roller of larger surface diameter were employed.

While the yarn is suitably guided from the bobbins to the cones, it will be observed by reference to Figure 2 that there is no guide between the rollers or collars and the cones which would prevent the yarn from moving sidewise over the collars while being wound.

I claim as my invention:

1. A cone winding machine comprising a plurality of cones mounted to revolve about horizontal axes, a plurality of yarn carrying bobbins, means for guiding the yarn from the bobbins to the cones, a horizontally arranged water-containing trough interposed between the bobbins and the cones, a horizontally arranged shaft associated with the trough, spaced collars on the shaft which revolve about the axis thereof which are of larger diameter than the shaft and are partially submerged in the liquid, and the upper portions of which are engaged by the yarn as it moves from the bobbins to the cones crosswise of the collars and lengthwise thereof, and means for rotating the cones at a high speed.

2. A cone winding machine comprising a plurality of cones mounted to revolve about horizontal axes, a plurality of yarn carrying bobbins, means for guiding the yarn from the bobbins to the cones, a horizontally arranged water-containing trough interposed between the bobbins and the cones, a horizontally arranged shaft associated with the trough, and collars on the shaft which are partially submerged in the liquid and are rotated in contact with the yarn continuously as it passes from the bobbins to the cones and as it moves sidewise substantially from end to end of the collars.

3. A cone winding machine comprising a plurality of cones mounted to revolve about horizontal axes, a plurality of yarn carrying bobbins, means for guiding the yarn from the bobbins to the cones, a horizontally arranged water-containing trough interposed between the bobbins and the cones, a horizontally arranged shaft associated with the trough, and collars on the shaft arranged in the same vertical planes as the central portions of the cones which are partially submerged in the liquid and rotate in contact with the yarn as it passes from the bobbins to the cones and as it moves sidewise in opposite directions substantially from end to end of the collars.

4. A cone winding machine for winding a plurality of cones, means for winding yarn upon said cones, means for moistening the yarn, said last mentioned means comprising a water-containing trough mounted adjacent the cones, a fixed shaft extending longitudinally of the trough, enlargements rotatably mounted on said shaft, and partially submerged in the water, there being an enlargement for each cone, said enlargements arranged in the path of the yarn and being engaged and rotated by the yarn as the yarn is being wound on the cones.

5. Yarn moistening means including a moistening roller revoluble about a horizontal axis, means for causing the yarn to bear against the periphery of said roller, means for causing the traverse of the yarn longitudinally of the roller and substantially the entire length thereof, and means for moistening the roller.

ADOLPH A. JOHNSON.